(12) United States Patent
Huang (10) Patent No.: US 12,369,207 B2
(45) Date of Patent: Jul. 22, 2025

(54) PROMPT INFORMATION DISPLAY METHOD AND APPARATUS AND ELECTRONIC DEVICE

(71) Applicant: VIVO MOBILE COMMUNICATION CO., LTD., Dongguan (CN)

(72) Inventor: Kaiyu Huang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 356 days.

(21) Appl. No.: 18/134,251

(22) Filed: Apr. 13, 2023

(65) Prior Publication Data

US 2023/0254915 A1 Aug. 10, 2023

Related U.S. Application Data

(63) Continuation of application No. PCT/CN2021/124964, filed on Oct. 20, 2021.

(30) Foreign Application Priority Data

Oct. 27, 2020 (CN) .......................... 202011165263.X (51) Int. Cl.
*H04W 76/14* (2018.01)
*H04B 17/318* (2015.01)
(Continued)

(52) U.S. Cl.
CPC .......... *H04W 76/14* (2018.02); *H04B 17/318* (2015.01); *H04W 72/54* (2023.01)

(58) Field of Classification Search
CPC ....... H04W 76/14; H04W 72/54; H04W 4/80; H04W 84/18; H04B 17/318; H04B 17/27;
(Continued)

(56) References Cited

U.S. PATENT DOCUMENTS 9,913,230 B1 3/2018 Tyagi et al.
10,003,913 B2 6/2018 Jin et al.
(Continued)

FOREIGN PATENT DOCUMENTS

CN 103840857 A 6/2014
CN 104780429 A 7/2015
(Continued)

*Primary Examiner* — Jenee Holland
(74) *Attorney, Agent, or Firm* — The Webb Law Firm (57) ABSTRACT

A prompt information display method includes: in a case that a found wireless headset is in an unpaired state and a non-pairing mode, adjusting a mode of the wireless headset to a pairing mode; obtaining transmitted signal strength of a wireless signal sent by the wireless headset, a target occlusion gradient of the wireless signal detected by the wireless headset, and received signal strength of a received wireless signal; determining, according to an association relationship between an occlusion gradient and a signal threshold, a target signal threshold corresponding to the target occlusion gradient; and displaying headset connection prompt information corresponding to the wireless headset in a case that a difference between the transmitted signal strength and the received signal strength is greater than or equal to the target signal threshold.

20 Claims, 2 Drawing Sheets

In a case that a found wireless headset is in an unpaired state and a non-pairing mode, adjust a mode of the wireless headset to a pairing mode — 101

Obtain transmit signal strength of a wireless signal sent by the wireless headset, a target occlusion gradient of the wireless signal detected by the wireless headset, and received signal strength of a received wireless signal — 102

Determine, according to an association relationship between an occlusion gradient and a signal threshold, a target signal threshold corresponding to the target occlusion gradient — 103

Display headset connection prompt information corresponding to the wireless headset in a case that a difference between the transmitted signal strength and the received signal strength is greater than or equal to the target signal threshold — 104

(51) Int. Cl.
*H04L 41/0816* (2022.01)
*H04W 72/54* (2023.01)

(58) Field of Classification Search
CPC .......... H04L 41/0816; H04M 2250/02; H04M 1/6066; H04M 1/72412; Y02D 30/70
See application file for complete search history.

(56) References Cited

U.S. PATENT DOCUMENTS

| | | | |
|---|---|---|---|
| 10,048,906 | B2 | 8/2018 | Yasuno |
| 2012/0044998 | A1* | 2/2012 | Kokaram ................ G06T 7/215 |
| | | | 375/E7.125 |
| 2016/0380704 | A1 | 12/2016 | Hemes et al. |
| 2017/0280277 | A1 | 9/2017 | Ge et al. |
| 2017/0332190 | A1 | 11/2017 | James et al. |
| 2019/0339528 | A1* | 11/2019 | Freeman ................ G09G 3/002 |
| 2020/0107127 | A1 | 4/2020 | Gong et al. |
| 2021/0326694 | A1* | 10/2021 | Wang ..................... G06N 3/084 |

FOREIGN PATENT DOCUMENTS

| | | |
|---|---|---|
| CN | 106561059 A | 4/2017 |
| CN | 109041031 A | 12/2018 |
| CN | 109068302 A | 12/2018 |
| CN | 109257732 A | 1/2019 |
| CN | 109286870 A | 1/2019 |
| CN | 109862549 A | 6/2019 |
| CN | 110267231 A | 9/2019 |
| CN | 111107667 A | 5/2020 |
| CN | 112333332 A | 2/2021 |
| WO | 2020080776 A1 | 4/2020 |

* cited by examiner

PROMPT INFORMATION DISPLAY METHOD AND APPARATUS AND ELECTRONIC DEVICE

CROSS-REFERENCE TO RELATED APPLICATIONS

This application is a Bypass Continuation Application of PCT/CN2021/124964, filed on Oct. 20, 2021, and claims priority to Chinese Patent Application No. 202011165263.X filed on Oct. 27, 2020, the disclosures of which are hereby incorporated by reference in their entireties.

BACKGROUND OF THE INVENTION

Field of the Invention

This application pertains to the field of communication technologies, and specifically relates to a prompt information display method and apparatus and an electronic device.

Description of Related Art

With continuous development of science and technologies, an electronic device (such as a mobile phone or a tablet computer) has gradually become an indispensable tool in people's life.

SUMMARY OF THE INVENTION

Embodiments of this application provide a prompt information display method and apparatus and an electronic device.

According to a first aspect, an embodiment of this application provides a prompt information display method, and the method includes:
  in a case that a found wireless headset is in an unpaired state and a non-pairing mode, adjusting a mode of the wireless headset to a pairing mode;
  obtaining transmitted signal strength of a wireless signal sent by the wireless headset, a target occlusion gradient of the wireless signal detected by the wireless headset, and received signal strength of a received wireless signal;
  determining, according to an association relationship between an occlusion gradient and a signal threshold, a target signal threshold corresponding to the target occlusion gradient; and
  displaying headset connection prompt information corresponding to the wireless headset in a case that a difference between the transmitted signal strength and the received signal strength is greater than or equal to the target signal threshold.

According to a second aspect, an embodiment of this application provides a prompt information display apparatus, and the apparatus includes:
  a pairing mode adjustment module, configured to: in a case that a found wireless headset is in an unpaired state and a non-pairing mode, adjust a mode of the wireless headset to a pairing mode;
  a signal strength obtaining module, configured to obtain transmitted signal strength of a wireless signal sent by the wireless headset, a target occlusion gradient of the wireless signal detected by the wireless headset, and received signal strength of a received wireless signal;
  a target threshold determining module, configured to determine, according to an association relationship between an occlusion gradient and a signal threshold, a target signal threshold corresponding to the target occlusion gradient; and
  a prompt information display module, configured to display headset connection prompt information corresponding to the wireless headset in a case that a difference between the transmitted signal strength and the received signal strength is greater than or equal to the target signal threshold.

According to a third aspect, an embodiment of this application provides an electronic device. The electronic device includes a processor, a memory, and a program or an instruction that is stored in the memory and executable on the processor, and when the program or the instruction is executed by the processor, steps in the prompt information display method described in the first aspect are implemented.

According to a fourth aspect, an embodiment of this application provides a non-transitory readable storage medium, where the non-transitory readable storage medium stores a program or an instruction, and when the program or the instruction is executed by a processor, steps in the prompt information display method described in the first aspect are implemented.

According to a fifth aspect, an embodiment of this application provides a chip, where the chip includes a processor and a communication interface, the communication interface is coupled to the processor, and the processor is configured to run a program or an instruction to implement steps in the prompt information display method described in the first aspect.

According to a sixth aspect, an embodiment of this application provides a computer program product, where the computer program product is executable by a processor to implement steps in the prompt information display method described in the first aspect.

DESCRIPTION OF THE INVENTION

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art shall fall within the protection scope of this application.

Terms "first" and "second" in the specification and claims of this application are used to distinguish between similar objects, and do not need to be used to describe a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and the character "/" generally represents an "or" relationship between associated objects.

Currently, to improve user convenience and conveniently enable a user to perform pairing and connection, wireless Bluetooth headsets of all manufacturers in the market customizes a quick pairing function for deep adaptation of electronic devices produced by the manufacturers, to search for a Bluetooth device in a nearby searching range and actively display a connection pop-up window on the electronic device to prompt the user to perform the connection.

However, in a related technology, which headsets are target devices and which headsets are not target devices cannot be directly determined. Therefore, provided that the electronic device finds the headset, a paired pop-up window is displayed. Although this design manner may make connection pairing of the user fast, a non-user around the headset is disturbed greatly. For example, when a person opens a headset box in a conference room, a subway, a library, and an elevator with relatively dense people, all other mobile phones of the same brand display the following pop-up window on mobile phones, which causes interference to a current operation and use, thereby reducing use experience of the user.

A prompt information display method and apparatus and an electronic device provided in embodiments of this application are described below in detail with reference to the accompanying drawings by using embodiments and an application scenario thereof.

Figure 1:
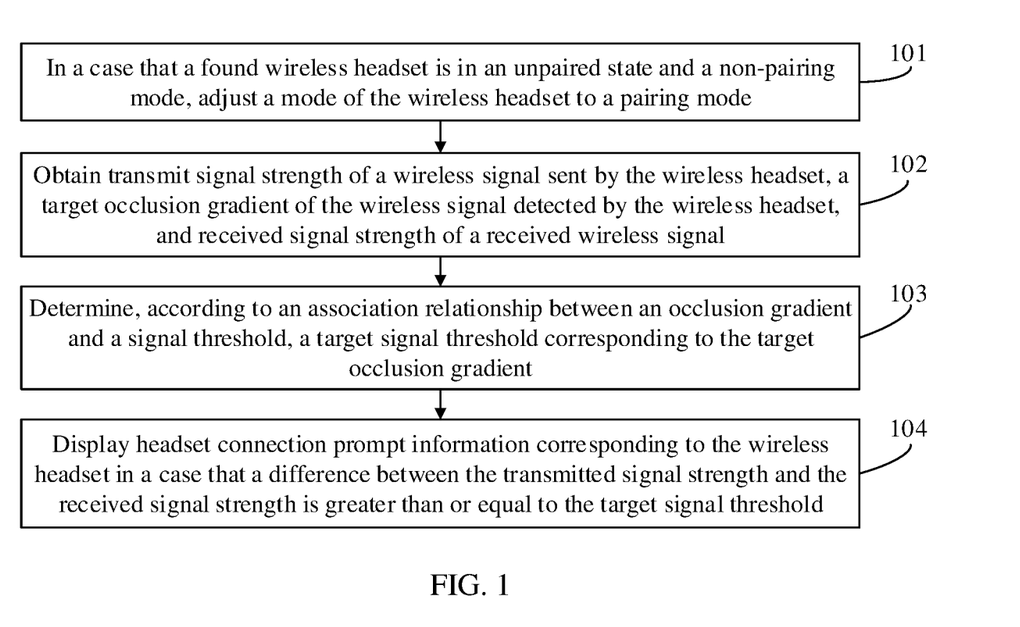
FIG. 1 is a step flowchart of a prompt information display method according to an embodiment of this application.

FIG. 1 is a step flowchart of a prompt information display method according to an embodiment of this application. As shown in FIG. 1, the prompt information display method may include the following steps:

Step 101: in a case that a found wireless headset is in an unpaired state and a non-pairing mode, adjust a mode of the wireless headset to a pairing mode.

This embodiment of this application may be applied to a scenario in which whether to display a headset connection pop-up window on a side of the electronic device is determined according to strength of a signal sent by the wireless headset and strength of a signal received by an electronic device.

The wireless headset refers to a headset that is found by the electronic device and that needs to be paired by using Bluetooth. Bluetooth pairing refers to a process of mutual identity authentication between two devices (that is, the electronic device and the wireless headset).

The pairing mode means that a Bluetooth device is in a specific state in which identity authentication can be performed (similar to that a password can be entered only on a specific interface). Being capable of being paired with a new device only after entering the pairing mode does not indicate that entering the pairing mode means being successfully paired with the new device (similar to that entering a password entering interface does not indicate that the password has been entered and does not indicate that the password is entered successfully). Opposite to the pairing mode, any state in which identity authentication cannot be performed with a new device is collectively referred to as the non-pairing mode.

The paired state refers to a state in which identity authentication between two devices succeeds. An authentication failure/unverified state is always the unpaired state. A device in the unpaired state can be connected only after pairing succeeds, and a device in the paired state can be directly connected without repeated authentication.

In a case that the electronic device is currently in the unpaired state with the found wireless headset and the wireless headset is in the non-pairing mode, if a user needs to use the wireless headset, the user first needs to adjust the mode of the wireless headset, that is, the user manually adjusts the mode of the wireless headset to the pairing mode, and keeps the wireless headset in the mode. Optionally, to keep the wireless headset in the pairing mode, the wireless headset needs to be continuously uncapped. Because a shape of a headset box is a pebble shape, the wireless headset must be in a hand-held state to be uncapped in a case that an external tool is not used. Once being put down, the wireless headset is automatically capped.

In a case that the found wireless headset is in the unpaired state and the non-pairing mode, after the mode of the wireless headset is adjusted to the pairing mode, step 102 is performed.

Step 102: obtain transmitted signal strength of a wireless signal sent by the wireless headset, a target occlusion gradient of the wireless signal detected by the wireless headset, and received signal strength of a received wireless signal.

The transmitted signal strength refers to signal strength of the wireless signal sent by the wireless headset.

The received signal strength (Received Signal Strength Indication, RSSI) refers to strength of the wireless signal that is sent by the wireless headset and received by the electronic device.

The target occlusion gradient may be used to indicate a degree of occlusion of the wireless signal between the electronic device and the wireless headset. In this example, an infrared component is added to a signal transceiver component of the headset box, to determine whether an RSSI signal transceiver of the headset box is obstructed by a headset box in a hand-held uncapping mode, and determine, according to a degree of severity of obstruction by infrared, a degree of the signal to be obstructed.

After the mode of the wireless headset is adjusted to the pairing mode, the transmitted signal strength of the wireless signal sent by the wireless headset, the target occlusion gradient of the wireless signal detected by the wireless headset, and the received signal strength of the received wireless signal may be obtained. Further, step 103 is performed.

Step 103: determine, according to an association relationship between an occlusion gradient and a signal threshold, a target signal threshold corresponding to the target occlusion gradient.

The target signal threshold is a signal strength threshold corresponding to the target occlusion gradient.

In this embodiment of this application, the association relationship between the occlusion gradient and the signal threshold may be established in advance. A process of establishing the association relationship may be described in detail with reference to the following implementations.

In an implementation of this application, before the foregoing step 101, the method may further include:

Sub-step S1: set a distance between the wireless headset and the electronic device to a preset distance.

In this embodiment of this application, the preset distance is a distance that is preset by service personnel and that is used to determine whether the wireless headset and the electronic device are mutually target devices. For example, a mobile phone and the headset may be mutual devices only when a distance between the mobile phone and the headset is relatively small, that is, the mobile phone pops up a quick pairing floating window only when finding that an unpaired headset is within a specific distance (a server is configurable). After a scenario is determined, a distance in a tentacle range in a normal case may be limited within 40 cm by analyzing ergonomic data. Therefore, a range of the distance may be initially within a range of 40 cm.

When signal thresholds of different occlusion gradients need to be tested, the distance between the wireless headset and the electronic device may be set to the preset distance. Further, sub-step S2 is performed.

Sub-step S2: add obstructions with multiple shielding gradients between the electronic device and the wireless headset.

The occlusion gradient may be used to indicate an occlusion degree of the wireless signal between the electronic device and the wireless headset. In this embodiment of this application, complete unocclusion may be pre-defined as 0, complete occlusion is defined as 100, and there are 10 gradients in an interval of 1 to 100.

After the distance between the wireless headset and the electronic device is set to the preset distance, obstacles of multiple obstruction gradients may be added between the electronic device and the wireless headset, to perform a subsequent test process.

After the obstacles of the multiple obstruction gradients are added between the electronic device and the wireless headset, sub-step S3 is performed.

Sub-step S3: obtain, for each occlusion gradient, initial signal strength of a wireless signal sent by the wireless headset at the occlusion gradient and target signal strength of a received wireless signal at the occlusion gradient.

For each occlusion gradient, the initial signal strength of the wireless signal sent by the wireless headset and the target signal strength of the wireless signal sent by the wireless headset and received by the electronic device at each occlusion gradient may be obtained. Further, sub-step S4 is performed.

Sub-step S4: determine, according to a difference between the initial signal strength and the target signal strength, a signal threshold corresponding to the occlusion gradient.

After the difference between the initial signal strength and the target signal strength is obtained, the signal threshold of the occlusion gradient may be determined according to the difference. Optionally, the difference may be used as the signal threshold.

Certainly, in this embodiment of this application, multiple tests may be performed on each occlusion gradient, and further, multiple initial signal strength and multiple target signal strength may be obtained. Further, with reference to differences between the multiple initial signal strength and the multiple target signal strength, an average difference is calculated, and the average difference is used as a signal threshold corresponding to the occlusion gradient.

In this embodiment of this application, signal thresholds corresponding to multiple occlusion gradients are obtained in advance. Further, in a subsequent process, a process of determining whether the electronic device and the wireless headset are mutually target devices may be performed according to different occlusion gradients, so that accuracy of determining whether the electronic device and the wireless headset are mutually target devices can be improved.

After the target signal threshold corresponding to the target occlusion gradient is determined according to the association relationship between the occlusion gradient and the signal threshold, step 104 is performed.

Step 104: display headset connection prompt information corresponding to the wireless headset in a case that a difference between the transmitted signal strength and the received signal strength is greater than or equal to the target signal threshold.

After the target signal threshold is determined, the difference between the transmitted signal strength and the received signal strength may be calculated, and a magnitude relationship between the difference and the target signal threshold is determined.

The headset connection prompt information is prompt information used to prompt the user to connect to the wireless headset. In this embodiment of this application, the headset connection prompt information may be prompt information displayed in a headset connection pop-up window.

In a case that the difference between the transmitted signal strength and the received signal strength is greater than or equal to the target signal threshold, it may be determined that the distance between the electronic device and the wireless headset is within a preset distance range. In this case, it may be determined that the electronic device and the wireless headset are mutually target device. In this case, the headset connection prompt information of the wireless headset may be displayed on a specified interface of the electronic device, to prompt the user to connect the wireless headset.

Certainly, in a case that the difference between the transmitted signal strength and the received signal strength is less than the target signal threshold, it may be determined that the distance between the electronic device and the wireless headset is outside the preset distance range. In this case, it may be determined that the electronic device and the wireless headset are not mutual target devices. In this case, the headset connection prompt information of the wireless headset may be intercepted, to avoid displaying the headset connection prompt information on the specified interface of the electronic device, and avoid causing interference to a user of an electronic device that is not the target device.

In this embodiment of this application, in a case that the wireless headset found by the electronic device is in the pairing mode, the headset connection prompt information corresponding to the wireless headset may be displayed. Optionally, when the wireless headset found by the electronic device is in the pairing mode, it may be clearly determined that a current objective of a headset user is to be paired with a surrounding electronic device, and a new device has no specific range limit (any electronic device that can be found nearby may be a to-be-paired target device). Therefore, in this scenario, no additional limit is added, provided that all electronic devices that can be found around the headset display quick pairing prompt information (for example, a headset connection pop-up window).

In this embodiment of this application, in a case that the wireless headset found by the electronic device is in the paired state, a headset connection prompt corresponding to the wireless headset may be displayed. Optionally, when the electronic device and the found wireless headset are paired, it is possibly determined that the electronic headset and the wireless headset belong to a same user. In this case, regardless of whether to be paired or connected, it is of the largest possibility that the headset and the electronic device are mutual target devices. Therefore, in this scenario, no additional limit is added, and quick pairing prompt information (such as a headset connection pop-up window) is displayed provided that the found headset has been paired with the current electronic device.

In the prompt information display method provided in this embodiment of this application, in a case that a found wireless headset is in an unpaired state and a non-pairing mode, a mode of the wireless headset is adjusted to a pairing mode; transmitted signal strength of a wireless signal sent by the wireless headset, a target occlusion gradient of the wireless signal detected by the wireless headset, and received signal strength of the received wireless signal are obtained; a target signal threshold corresponding to the target occlusion gradient is determined according to an association relationship between an occlusion gradient and a signal threshold; and headset connection prompt information corresponding to the wireless headset is displayed in a case that a difference between the transmitted signal strength and the received signal strength is greater than or equal to a target signal threshold. In this embodiment of this application, a distance between an electronic device and the wireless headset is determined with reference to the transmitted signal strength, the received signal strength, and the target signal threshold, and whether the electronic device and the wireless headset are target devices of each other is determined with reference to the distance. Therefore, display of a headset connection pop-up window on an electronic device of a non-user can be avoided, a problem of disturbing the non-user is resolved, and use experience of a user is improved.

It should be noted that, the prompt information display method provided in this embodiment of this application may be performed by a prompt information display apparatus, or a control module that is in the prompt information display apparatus and that is configured to perform the prompt information display method. In this embodiment of this application, an example in which the prompt information display apparatus performs the prompt information display method is used to describe the prompt information display apparatus provided in this embodiment of this application.

Figure 2:
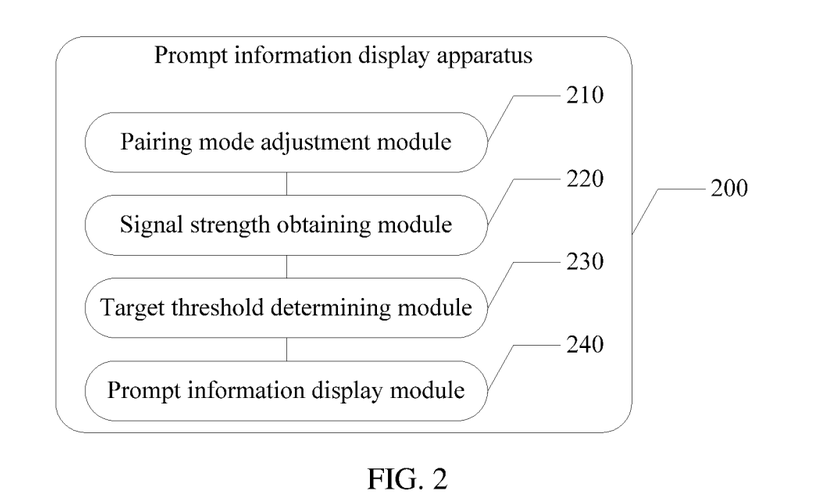
FIG. 2 is a schematic diagram of a structure of a prompt information display apparatus according to an embodiment of this application.

FIG. 2 is a schematic diagram of a structure of a prompt information display apparatus according to an embodiment of this application. As shown in FIG. 2, the prompt information display apparatus 200 may include the following modules:

a pairing mode adjustment module 210, configured to: in a case that a found wireless headset is in an unpaired state and a non-pairing mode, adjust a mode of the wireless headset to a pairing mode;

a signal strength obtaining module 220, configured to obtain transmitted signal strength of a wireless signal sent by the wireless headset, a target occlusion gradient of the wireless signal detected by the wireless headset, and received signal strength of a received wireless signal;

a target threshold determining module 230, configured to determine, according to an association relationship between an occlusion gradient and a signal threshold, a target signal threshold corresponding to the target occlusion gradient; and a prompt information display module 240, configured to display headset connection prompt information corresponding to the wireless headset in a case that a difference between the transmitted signal strength and the received signal strength is greater than or equal to the target signal threshold.

Optionally, the prompt information display apparatus 200 further includes:

a preset distance setting module, configured to set a distance between the wireless headset and an electronic device to a preset distance;

an obstruction adding module, configured to add obstructions with multiple shielding gradients between the electronic device and the wireless headset;

a target signal strength obtaining module, configured to obtain, for each occlusion gradient, initial signal strength of a wireless signal sent by the wireless headset at the occlusion gradient and target signal strength of a received wireless signal at the occlusion gradient; and a signal threshold determining module, configured to determine, according to a difference between the initial signal strength and the target signal strength, a signal threshold corresponding to the occlusion gradient.

Optionally, the prompt information display apparatus 200 further includes:

a prompt information interception module, configured to intercept the headset connection prompt information in a case that the difference between the transmitted signal strength and the received signal strength is less than the target signal threshold.

Optionally, the prompt information display apparatus 200 further includes:

a first information display module, configured to: in a case that the found wireless headset is in the pairing mode, display the headset connection prompt information corresponding to the wireless headset.

Optionally, the prompt information display apparatus 200 further includes:

a second information display module, configured to: in a case that the found wireless headset is in the paired state, display the headset connection prompt information corresponding to the wireless headset.

In the prompt information display apparatus provided in this embodiment of this application, in a case that a found wireless headset is in an unpaired state and a non-pairing mode, a mode of the wireless headset is adjusted to a pairing mode; transmitted signal strength of a wireless signal sent by the wireless headset, a target occlusion gradient of the wireless signal detected by the wireless headset, and received signal strength of the received wireless signal are obtained; a target signal threshold corresponding to the target occlusion gradient is determined according to an association relationship between an occlusion gradient and a signal threshold; and a headset connection pop-up window corresponding to the wireless headset is displayed in a case that a difference between the signal strength and the received signal strength is greater than or equal to the target signal threshold. In this embodiment of this application, a distance between an electronic device and the wireless headset is determined with reference to the transmitted signal strength, the received signal strength, and the target signal threshold, and whether the electronic device and the wireless headset are target devices of each other is determined with reference to the distance. Therefore, display of headset connection prompt information on an electronic device of a non-user can be avoided, a problem of disturbing the non-user is resolved, and use experience of a user is improved.

The prompt information display apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an ultra-mobile personal computer (UMPC), a netbook, or a personal digital assistant (PDA), and the non-mobile electronic device may be a server, a network attached storage (NAS), a personal computer (PC), a television (TV), a counter, or a self-service machine. This is not specifically limited in this embodiment of this application.

The prompt information display apparatus in this embodiment of this application may be an apparatus with an operating system. The operating system may be an Android operating system, may be an iOS operating system, or may be another possible operating system. This is not specifically limited in this embodiment of this application.

The prompt information display apparatus provided in this embodiment of this application can implement processes implemented in the method embodiment of FIG. 1. To avoid repetition, details are not described herein again.

Figure 3:
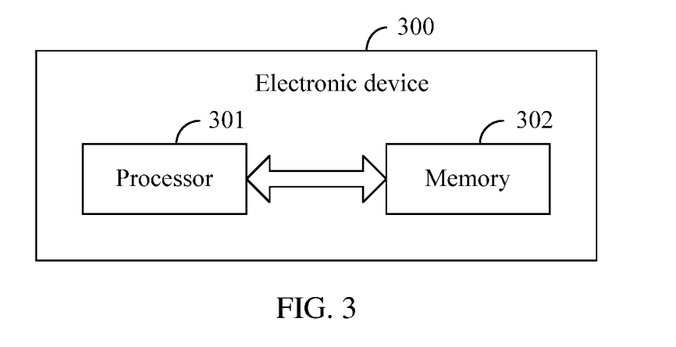
FIG. 3 is a schematic diagram of a structure of an electronic device according to an embodiment of this application.

Optionally, as shown in FIG. 3, an embodiment of this application further provides an electronic device 300, including a processor 301, a memory 302, and a program or an instruction that is stored in the memory 302 and that can run on the processor 301. When the program or the instruction is executed by the processor 301, processes of the embodiments of the prompt information display method can be implemented, and a same technical effect can be achieved. To avoid repetition, details are not described herein.

It should be noted that the electronic device in this embodiment of this application includes the foregoing mobile electronic device and the foregoing non-mobile electronic device.

Figure 4:
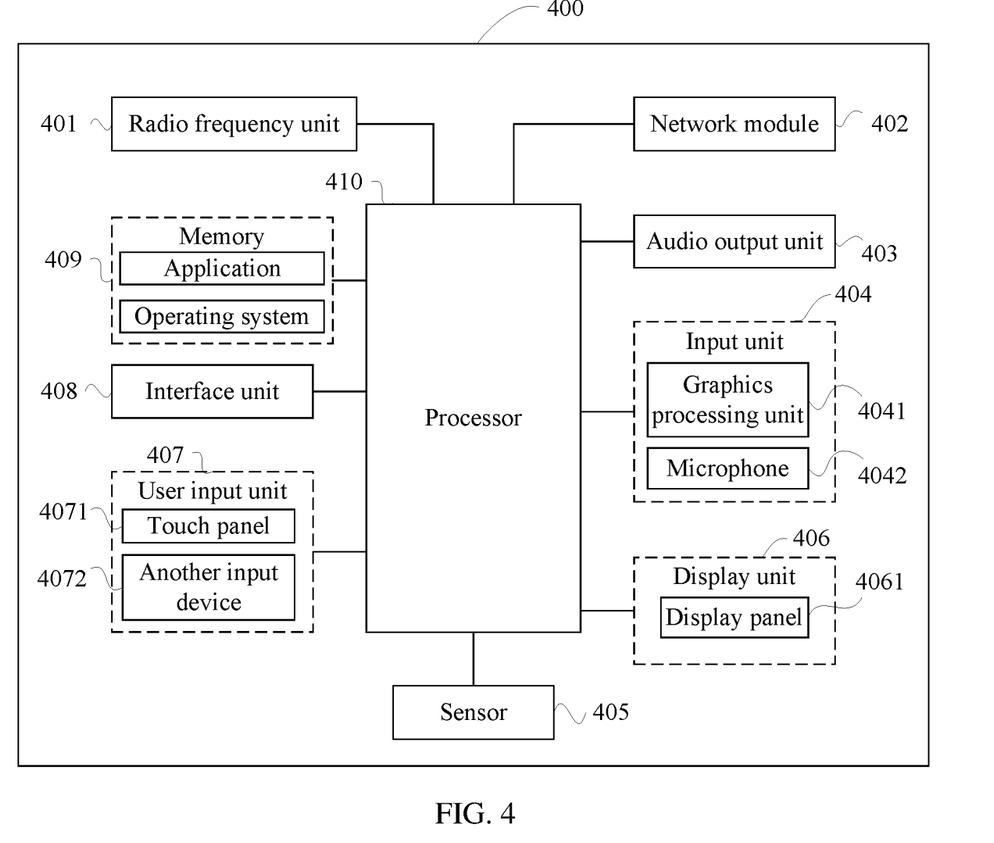
FIG. 4 is a schematic diagram of a hardware structure of an electronic device according to an embodiment of this application.

FIG. 4 is a schematic diagram of a hardware structure of an electronic device according to an embodiment of this application.

The electronic device 400 includes but is not limited to components such as a radio frequency unit 401, a network module 402, an audio output unit 403, an input unit 404, a sensor 405, a display unit 406, a user input unit 407, an interface unit 408, a memory 409, and a processor 410.

It may be understood by a person skilled in the art that the electronic device 400 may further include a power supply (such as a battery) that supplies power to each component. The power supply may be logically connected to the processor 410 by using a power management system, to implement functions such as charging, discharging, and power consumption management by using the power management system. A structure of the electronic device shown in FIG. 4 does not constitute a limitation on the electronic device, and may include more or fewer parts than those shown in the figure, or combine some components, or have different part arrangements. Details are not described herein again.

The processor 410 is configured to: in a case that a found wireless headset is in an unpaired state and a non-pairing mode, adjust a mode of the wireless headset to a pairing mode; obtain transmitted signal strength of a wireless signal sent by the wireless headset, a target occlusion gradient of the wireless signal detected by the wireless headset, and received signal strength of a received wireless signal; determine, according to an association relationship between an occlusion gradient and a signal threshold, a target signal threshold corresponding to the target occlusion gradient; and display headset connection prompt information corresponding to the wireless headset in a case that a difference between the transmitted signal strength and the received signal strength is greater than or equal to the target signal threshold.

This embodiment of this application can avoid displaying a headset connection pop-up window on an electronic device of a non-user, resolve a problem of disturbing a non-user, and improve use experience of the user.

Optionally, the processor 410 is further configured to: set a distance between the wireless headset and an electronic device to a preset distance; add obstructions with multiple shielding gradients between the electronic device and the wireless headset; obtain, for each occlusion gradient, initial signal strength of a wireless signal sent by the wireless headset at the occlusion gradient and target signal strength of a received wireless signal at the occlusion gradient; and determine, according to a difference between the initial signal strength and the target signal strength, a signal threshold corresponding to the occlusion gradient.

Optionally, the processor 410 is further configured to intercept the headset connection prompt information in a case that the difference between the transmitted signal strength and the received signal strength is less than the target signal threshold.

Optionally, the processor 410 is further configured to: in a case that the found wireless headset is in the pairing mode, display the headset connection prompt information corresponding to the wireless headset.

Optionally, the processor 410 is further configured to: in a case that the found wireless headset is in the paired state, display the headset connection prompt information corresponding to the wireless headset.

In this embodiment of this application, corresponding thresholds are set for different occlusion gradients, so that accuracy of distance measurement can be improved. Therefore, whether the electronic device and the wireless headset are mutual target devices can be determined more accurately, and accuracy of displaying a headset connection pop-up window can be improved.

It should be understood that, in this embodiment of this application, the input unit 404 may include a graphics processing unit (GPU) 4041 and a microphone 4042. The graphics processing unit 4041 processes image data of a static picture or a video obtained by an image capture apparatus (such as a camera) in a video capture mode or an image capture mode. The display unit 406 may include a display panel 4061, and the display panel 4061 may be configured in a form of a liquid crystal display, an organic light emitting diode, or the like. The user input unit 407 includes a touch panel 4071 and another input device 4072. The touch panel 4071 is also referred to as a touchscreen. The touch panel 4071 may include two parts: a touch detection apparatus and a touch controller. The another input device 4072 may include but is not limited to one or more of a physical keyboard, a function key (such as a volume control key or an on/off key), a trackball, a mouse, a joystick, and the like. Details are not described herein. The memory 409 may be configured to store a software program and various data, including but not limited to an application program and an operating system. The processor 410 may be integrated with an application processor and a modem processor. The application processor mainly processes an operating system, a user interface, an application program, and the like, and the modem processor mainly processes wireless communication. It may be understood that the modem processor may also not be integrated into the processor 410.

An embodiment of this application further provides an electronic device, configured to perform processes of the embodiments of the foregoing prompt information display method, and a same technical effect can be achieved. To avoid repetition, details are not described herein again.

An embodiment of this application further provides a non-transitory readable storage medium. A program or an instruction is stored in the non-transitory readable storage medium. When the program or the instruction is executed by a processor, processes of the embodiments of the foregoing prompt information display method can be implemented, and a same technical effect can be achieved. To avoid repetition, details are not described herein.

The processor is a processor in the electronic device in the foregoing embodiment. The non-transitory readable storage medium includes a non-transitory computer-readable storage medium, and examples of the non-transitory computer readable storage medium include a non-transient computer-readable storage medium, such as a read-only memory (ROM), a random access memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the embodiments of the prompt information display method, and a same technical effect can be achieved. To avoid repetition, details are not described herein again.

It should be understood that the chip mentioned in this embodiment of this application may also be referred to as a system-level chip, a system chip, a chip system, or a system on a chip.

An embodiment of the present invention further provides a computer program product. The computer program product may be executed by a processor to implement processes of the embodiment of the foregoing prompt information display method, and a same technical effect can be achieved. To avoid repetition, details are not described herein again.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to perform the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

What is claimed is:

1. A prompt information display method, comprising:
   in a case that a found wireless headset is in an unpaired state and a non-pairing mode, adjusting a mode of the found wireless headset to a pairing mode;
   obtaining transmitted signal strength of a wireless signal sent by the found wireless headset, a target occlusion gradient of the wireless signal detected by the found wireless headset, and received signal strength of a received wireless signal;
   determining, according to an association relationship between an occlusion gradient and a signal threshold, a target signal threshold corresponding to the target occlusion gradient; and
   displaying headset connection prompt information corresponding to the found wireless headset in a case that a difference between the transmitted signal strength and the received signal strength is greater than or equal to the target signal threshold.

2. The method according to claim 1, wherein before adjusting the mode of the found wireless headset to the pairing mode, the method further comprises:
   setting a distance between the found wireless headset and an electronic device to a preset distance;
   adding obstructions with multiple shielding gradients between the electronic device and the found wireless headset;
   obtaining, for each occlusion gradient, initial signal strength of a wireless signal sent by the found wireless headset at the occlusion gradient and target signal strength of a received wireless signal at the occlusion gradient; and
   determining, according to a difference between the initial signal strength and the target signal strength, a signal threshold corresponding to the occlusion gradient.

3. The method according to claim 1, wherein after determining the target signal threshold corresponding to the target occlusion gradient, the method further comprises: intercepting the headset connection prompt information in a case that the difference between the transmitted signal strength and the received signal strength is less than the target signal threshold.

4. The method according to claim 1, wherein the method further comprises:
   in a case that the found wireless headset is in the pairing mode, displaying the headset connection prompt information corresponding to the found wireless headset.

5. The method according to claim 1, wherein the method further comprises:
   in a case that the found wireless headset is in a paired state, displaying the headset connection prompt information corresponding to the found wireless headset.

6. A computer program product, wherein the computer program product, when executed by a processor of an electronic device, causes the electronic device to perform the prompt information display method according to claim 1.

7. The computer program product according to claim 6, wherein the computer program product, when executed by the processor, causes the electronic device to further perform:
  setting a distance between the found wireless headset and an electronic device to a preset distance;
  adding obstructions with multiple shielding gradients between the electronic device and the found wireless headset;
  obtaining, for each occlusion gradient, initial signal strength of a wireless signal sent by the found wireless headset at the occlusion gradient and target signal strength of a received wireless signal at the occlusion gradient; and
  determining, according to a difference between the initial signal strength and the target signal strength, a signal threshold corresponding to the occlusion gradient.

8. The computer program product according to claim 6, wherein the computer program product, when executed by the processor, causes the electronic device to further perform:
  intercepting the headset connection prompt information in a case that the difference between the transmitted signal strength and the received signal strength is less than the target signal threshold.

9. The computer program product according to claim 6, wherein the computer program product, when executed by the processor, causes the electronic device to further perform:
  in a case that the found wireless headset is in the pairing mode, displaying the headset connection prompt information corresponding to the found wireless headset; or
  in a case that the found wireless headset is in a paired state, displaying the headset connection prompt information corresponding to the found wireless headset.

10. A chip, comprising a processor and a communication interface, wherein the communication interface is coupled to the processor, and the processor is configured to run a program or an instruction to implement steps in the prompt information display method according to claim 1.

11. An electronic device, comprising: a processor, a memory, and a program or an instruction that is stored in the memory and executable on the processor, wherein the program or the instruction, when executed by the processor, causes the electronic device to perform:
  in a case that a found wireless headset is in an unpaired state and a non-pairing mode, adjusting a mode of the found wireless headset to a pairing mode;
  obtaining transmitted signal strength of a wireless signal sent by the found wireless headset, a target occlusion gradient of the wireless signal detected by the found wireless headset, and received signal strength of a received wireless signal;
  determining, according to an association relationship between an occlusion gradient and a signal threshold, a target signal threshold corresponding to the target occlusion gradient; and
  displaying headset connection prompt information corresponding to the found wireless headset in a case that a difference between the transmitted signal strength and the received signal strength is greater than or equal to the target signal threshold.

12. The electronic device according to claim 11, wherein the program or the instruction, when executed by the processor, causes the electronic device to further perform:
  setting a distance between the found wireless headset and the electronic device to a preset distance;
  adding obstructions with multiple shielding gradients between the electronic device and the found wireless headset;
  obtaining, for each occlusion gradient, initial signal strength of a wireless signal sent by the found wireless headset at the occlusion gradient and target signal strength of a received wireless signal at the occlusion gradient; and
  determining, according to a difference between the initial signal strength and the target signal strength, a signal threshold corresponding to the occlusion gradient.

13. The electronic device according to claim 11, wherein the program or the instruction, when executed by the processor, causes the electronic device to further perform:
  intercepting the headset connection prompt information in a case that the difference between the transmitted signal strength and the received signal strength is less than the target signal threshold.

14. The electronic device according to claim 11, wherein the program or the instruction, when executed by the processor, causes the electronic device to further perform:
  in a case that the found wireless headset is in the pairing mode, displaying the headset connection prompt information corresponding to the found wireless headset.

15. The electronic device according to claim 11, wherein the program or the instruction, when executed by the processor, causes the electronic device to further perform:
  in a case that the found wireless headset is in a paired state, displaying the headset connection prompt information corresponding to the found wireless headset.

16. A non-transitory readable storage medium, wherein the non-transitory readable storage medium stores a program or an instruction, and the program or the instruction, when executed by a processor in an electronic device, causes the electronic device to perform:
  in a case that a found wireless headset is in an unpaired state and a non-pairing mode, adjusting a mode of the found wireless headset to a pairing mode;
  obtaining transmitted signal strength of a wireless signal sent by the found wireless headset, a target occlusion gradient of the wireless signal detected by the found wireless headset, and received signal strength of a received wireless signal;
  determining, according to an association relationship between an occlusion gradient and a signal threshold, a target signal threshold corresponding to the target occlusion gradient; and
  displaying headset connection prompt information corresponding to the found wireless headset in a case that a difference between the transmitted signal strength and the received signal strength is greater than or equal to the target signal threshold.

17. The non-transitory readable storage medium according to claim 16, wherein the program or the instruction, when executed by the processor, causes the electronic device to further perform:
  setting a distance between the found wireless headset and the electronic device to a preset distance;
  adding obstructions with multiple shielding gradients between the electronic device and the found wireless headset;
  obtaining, for each occlusion gradient, initial signal strength of a wireless signal sent by the found wireless headset at the occlusion gradient and target signal strength of a received wireless signal at the occlusion gradient; and determining, according to a difference between the initial signal strength and the target signal strength, a signal threshold corresponding to the occlusion gradient.

18. The non-transitory readable storage medium according to claim 16, wherein the program or the instruction, when executed by the processor, causes the electronic device to further perform:

intercepting the headset connection prompt information in a case that the difference between the transmitted signal strength and the received signal strength is less than the target signal threshold.

19. The non-transitory readable storage medium according to claim 16, wherein the program or the instruction, when executed by the processor, causes the electronic device to further perform:

in a case that the found wireless headset is in the pairing mode, displaying the headset connection prompt information corresponding to the found wireless headset.

20. The non-transitory readable storage medium according to claim 16, wherein the program or the instruction, when executed by the processor, causes the electronic device to further perform:

in a case that the found wireless headset is in a paired state, displaying the headset connection prompt information corresponding to the found wireless headset.

* * * * *